United States Patent
Bosnjakovic

(10) Patent No.: US 10,867,249 B1
(45) Date of Patent: Dec. 15, 2020

(54) METHOD FOR DERIVING VARIABLE IMPORTANCE ON CASE LEVEL FOR PREDICTIVE MODELING TECHNIQUES

(71) Applicant: INTUIT INC., Mountain View, CA (US)

(72) Inventor: Dusan Bosnjakovic, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 696 days.

(21) Appl. No.: 15/474,820

(22) Filed: Mar. 30, 2017

(51) Int. Cl.
*G06N 5/02* (2006.01)
*G06N 20/00* (2019.01)

(52) U.S. Cl.
CPC .............. *G06N 5/02* (2013.01); *G06N 20/00* (2019.01)

(58) Field of Classification Search
CPC .................................. G06N 20/00; G06N 5/02
See application file for complete search history.

(56) References Cited

U.S. PATENT DOCUMENTS

| | | | | |
|---|---|---|---|---|
| 2004/0060006 A1* | 3/2004 | Lindblad | ............. | G06F 16/9027 715/234 |
| 2016/0110657 A1* | 4/2016 | Gibiansky | .............. | G06N 20/00 706/12 |

OTHER PUBLICATIONS

Gonzalez, C., et al. "Important variable assessment and electricity price forecasting based on regression tree models: classification and regression trees, Bagging and Random Forests", 2015, IET Generation, Transmission & Distribution, vol. 9, Issue 11, Aug. 6, 2015, p. 1120-1128 (Year: 2015).*
Genuer, R., et al., "Variable selection using random forests", 2010, Pattern Recognition Letters 31, p. 2225-2236 (Year: 2010).*
Elder, J. (Jan. 15, 2020). "3 Ways to Test the Accuracy of Your Predicitive Models". Retrieved from http://www.kdnuggets.com/2014/02/3-ways-to-test-accuracy-your-predictive-models.html.
Abbott, D. (Jan. 15, 20202). "Variable Importance using Target Shuffling". Retrieved from https://www.youtube.com/watch?v=OIHW7frH3ug.
Ribeiro, M. (Jan. 16, 2020). "LIME—Local Interpretable Model-Agnostic Explanations". Retrieved from https://homes.cs.washington.edu/~marcotcr/blog/lime/.

* cited by examiner

*Primary Examiner* — Eric Nilsson
(74) *Attorney, Agent, or Firm* — Patterson + Sheridan, LLP

(57) ABSTRACT

Techniques are disclosed herein for determining variable importance on a predictive model on a case level. Modeling data associated with a case is received. The modeling data provides input variables, each having a corresponding value for input to a predictive modeling technique associated with the case. A measure of impact for each of the variables is determined using an input shuffling method. Variables having a measure of impact that exceeds a specified threshold are identified. A summary that includes the identified variables is generated.

20 Claims, 8 Drawing Sheets

| V1 | V2 | V3 |
|---|---|---|
| Yes | 2 | 57.4 |
| Yes | 3 | 947.8 |
| No | 1 | 740.1 |
| No | 4 | 732.1 |
| No | 5 | 779.8 |
| Yes | 7 | 201.4 |
| No | 3 | 208.6 |

501

| V1 Shuffled | Score |
|---|---|
| No | 0.160 |
| Yes | 0.430 |
| No | 0.260 |
| No | 0.221 |
| Yes | 0.183 |
| Yes | 0.826 |
| No | 0.128 |

502

| Ref Score |
|---|
| 0.160 |
| 0.430 |
| 0.260 |
| 0.221 |
| 0.183 |
| 0.826 |
| 0.128 |

503

| Difference |
|---|
| 0 |
| 0 |
| 0 |
| 0 |
| 0 |
| 0 |
| StDev = 0 |

| V1 | V2 | V3 |
|----|----|------|
| Yes | 2 | 57.4 |
| Yes | 3 | 947.8 |
| No | 1 | 740.1 |
| No | 4 | 732.1 |
| No | 5 | 779.8 |
| Yes | 7 | 201.4 |
| No | 3 | 208.6 |

601

| V2 Shuffled | Score |
|---|---|
| 1 | 0.151 |
| 4 | 0.773 |
| 5 | 0.835 |
| 7 | 0.006 |
| 3 | 0.661 |
| 2 | 0.512 |
| 3 | 0.402 |

602

| Ref Score |
|---|
| 0.160 |
| 0.430 |
| 0.260 |
| 0.221 |
| 0.183 |
| 0.826 |
| 0.128 |

603

| Difference |
|---|
| -0.009 |
| 0.343 |
| 0.575 |
| -0.215 |
| 0.478 |
| -0.314 |
| 0.274 |
| StDev = 0.345 |

METHOD FOR DERIVING VARIABLE IMPORTANCE ON CASE LEVEL FOR PREDICTIVE MODELING TECHNIQUES

BACKGROUND

Field

Embodiments of the present disclosure generally relate to predictive models, and more specifically, to determining impact of input variables on a given predictive model on a case level by individual record or row, as opposed to the entire model).

Description of the Related Art

Predictive modeling refers to techniques for predicting outcomes based on historical statistical data. A predictive model comprises a number of predictors—variables that are likely to influence the outcomes. A predictive modeling exercise involves receiving input data associated with known outputs and generating a statistical model. Input data may represent a defined set of quantitative characteristics from which the model generates predicted outcomes.

Further, predictive models have useful applications in various settings. For example, in fraud detection, decision trees can model the likelihood that an individual has made a fraudulent claim based on data associated with the individual's claim. As another example, in healthcare, a logistic regression modeling technique can output the probability that a patient might be diagnosed with a certain condition based on data of previous occurrences of that condition in a broader population. Indeed, a variety of predictive models may be applied to a given setting.

Given the variety of existing predictive models, the complexity of those predictive models also varies with one another. Generally, more complex models often produce more accurate outcomes. Further, the more complex a given predictive model is, the less transparent it is in determining how a certain variable influences the outcomes produced by the model. The model developer or an end user evaluating results generated by a predictive model might want to know why a certain outcome was predicted, i.e., which variables might have significantly influenced the results and how.

SUMMARY

One embodiment presented herein discloses a method for determining variable importance on a predictive model on a case level. The method generally includes performing a predictive modeling technique on the modeling data associated with a plurality of cases to obtain a first set of scores. The modeling data provides a plurality of variables, each of the variables having a corresponding value in each case for input to the predictive modeling technique. For each of the plurality of variables, (i) the corresponding value of the variable in each case is randomly resampled, (ii) the predictive modeling technique is performed on the modeling data having the resampled corresponding value of the variable to obtain a second set of scores, and (iii) a measure of impact is determined based on a standard deviation between the first set of scores and the second set of scores. The measure of impact indicates a likelihood that the variable affects scores generated by the predictive modeling technique. One or more of the plurality of variables having a measure of impact that exceeds a specified threshold is identified. A summary including at least the identified one or more of the plurality of variables that exceed the specified threshold is generated.

Another embodiment presented herein discloses a computer-readable storage medium storing instructions, which, when executed on a processor, performs an operation for determining variable importance on a predictive model on a case level. The operation itself generally includes performing a predictive modeling technique on the modeling data associated with a plurality of cases to obtain a first set of scores. The modeling data provides a plurality of variables, each of the variables having a corresponding value in each case for input to the predictive modeling technique. For each of the plurality of variables, (i) the corresponding value of the variable in each case is randomly resampled, (ii) the predictive modeling technique is performed on the modeling data having the resampled corresponding value of the variable to obtain a second set of scores, and (iii) a measure of impact is determined based on a standard deviation between the first set of scores and the second set of scores. The measure of impact indicates a likelihood that the variable affects scores generated by the predictive modeling technique. One or more of the plurality of variables having a measure of impact that exceeds a specified threshold is identified. A summary including at least the identified one or more of the plurality of variables that exceed the specified threshold is generated.

Yet another embodiment presented herein discloses a system having a processor and a memory. The memory stores program code, which, when executed on the processor, performs an operation for determining variable importance on a predictive model on a case level. The operation itself generally includes performing a predictive modeling technique on the modeling data associated with a plurality of cases to obtain a first set of scores. The modeling data provides a plurality of variables, each of the variables having a corresponding value in each case for input to the predictive modeling technique. For each of the plurality of variables, (i) the corresponding value of the variable in each case is randomly resampled, (ii) the predictive modeling technique is performed on the modeling data having the resampled corresponding value of the variable to obtain a second set of scores, and (iii) a measure of impact is determined based on a standard deviation between the first set of scores and the second set of scores. The measure of impact indicates a likelihood that the variable affects scores generated by the predictive modeling technique. One or more of the plurality of variables having a measure of impact that exceeds a specified threshold is identified. A summary including at least the identified one or more of the plurality of variables that exceed the specified threshold is generated.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 5 illustrates an example of a case where shuffling a given variable does not impact results generated from a predictive model due to lack of variance in the output, according to one embodiment.

FIG. 6 illustrates an example of a case where shuffling a given variable impacts results generated from a predictive model due to high variance in the output, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
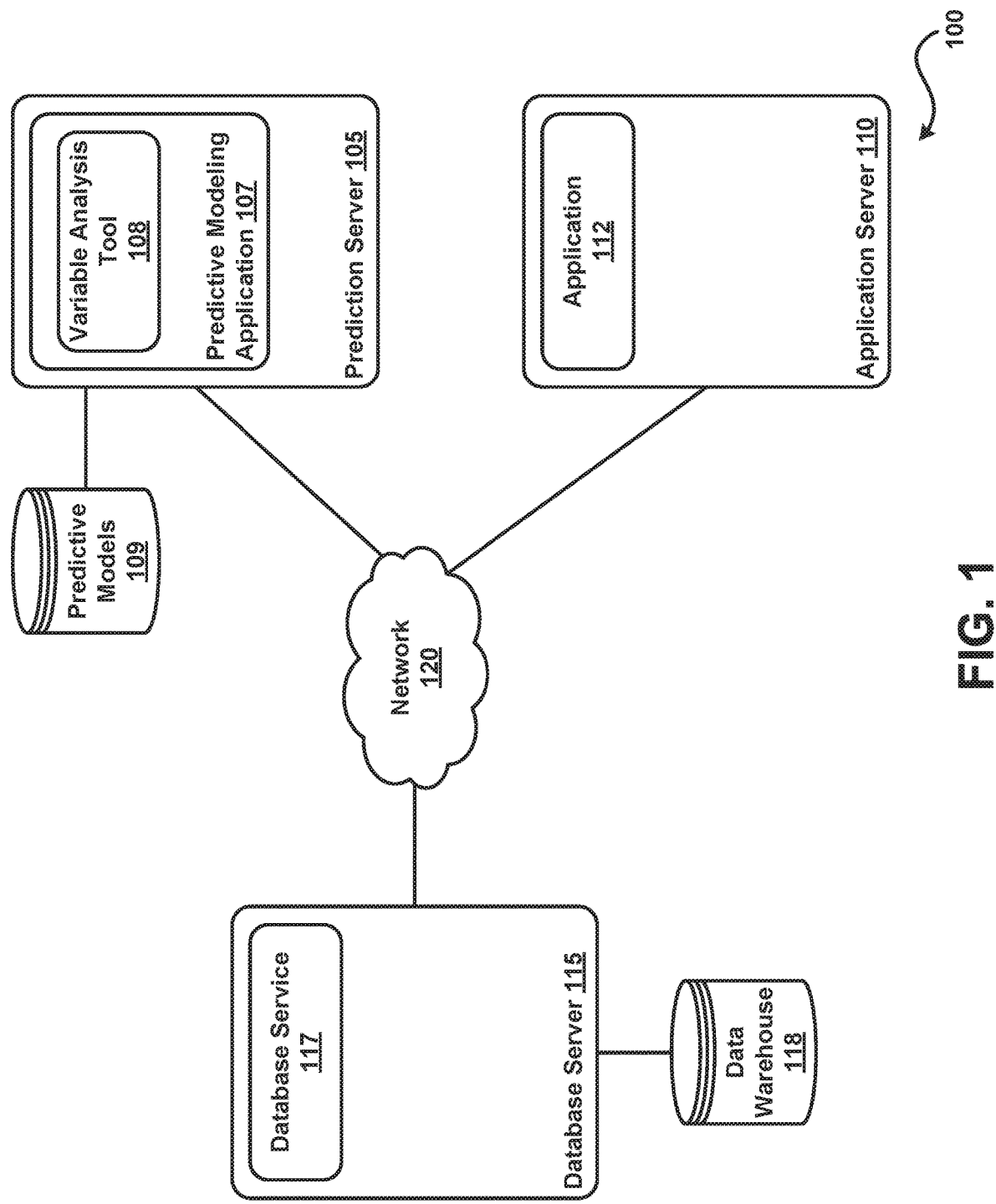
FIG. 1 illustrates an example computing environment, according to one embodiment.

Generally, predictive modeling techniques provide methods for determining variable importance, i.e., identifying which input variables influence outcomes generated by the model. However, such methods have limitations. For example, some techniques are limited to providing a ranking of variable importance, without indicating, for example, how a variable may impact the model (e.g., whether a greater value for the corresponding variable positively or negatively affects a resulting outcome, etc.).

In addition, complex predictive modeling techniques are not transparent to a user of those techniques for inspecting individual cases for further investigation. For example, ensemble modeling techniques do not typically provide insight regarding which variables have influence over a given case (i.e. record or row) score. Further still, cases associated with a given predictive modeling technique can vary greatly. For instance, for a particular predictive modeling technique, input variables that impact a case associated with a particular individual significantly may impact a case associated with a different individual less significantly.

Embodiments presented herein disclose techniques for determining variable importance on a case level for a prediction model. An example embodiment provides a process for sampling random values in each input variable (or a defined group of input variables) individually while holding the remaining variables constant. In particular, the process uses bootstrap sampling to replace values for a given value while values in the other variables remain constant.

Further, embodiments presented herein can be adapted as part of a predictive modeling application that generates models based on input data. For example, the application may provide a variable analysis tool that determines variable importance insights for a set of data associated with a case. In one embodiment, for a given model, the variable analysis tool receives training data to be used in generating the model. The training data includes values for a given case that are associated with variables that the model receives as input. Using the training data, the variable analysis tool generates reference scores by applying an underlying predictive modeling technique. The variable analysis tool then resamples the values for an input variable (while maintaining the original values for the remaining input variables) and generates a new set of scores. The variable analysis tool continues this process for values of each of the individual input variables.

For each of the input variables, the variable analysis tool compares the resulting scores with the reference scores. In particular, the variable analysis tool determines a standard deviation between each of the resulting scores and the corresponding reference scores. The standard deviation allows the variable analysis tool to determine how much the input variable affects the resulting scores. In addition, based on the deviation from the reference scores, the variable analysis tool may identify input variables that impact the model significantly.

In one embodiment, the predictive modeling application generates a summary to present to a user. For example, the predictive modeling application does so via a user interface presented on a management console. The summary provides insights regarding which input variables impacted the model significantly, how the input variables impacted the model (e.g., whether a value of the variable positively or negatively affected the score), and the like. Further, the summary allows the user to troubleshoot a predictive modeling technique to a given case or field. For instance, if the predictive model yields inaccurate outcomes, the user may pinpoint which variables were responsible for causing those outcomes. Once identified, the user may further fine-tune the model.

Advantageously, embodiments disclosed herein provide a case-level approach for determining variable importance. Further, this approach is agnostic to the type of model. That is, the approach determines variable importance by randomizing values in individual variables and generating the model using the randomized values. Therefore, this approach does not need to understand how a predictive modeling technique functions. As a result, this approach can be applied to classification models and regression models alike, without modification to the underlying modeling technique or to the variable analysis.

In addition, the approach described herein provides a number of advantages over currently existing approaches. For instance, one example existing approach involves generating insights about model predictions by analyzing the model locally and perturbing certain inputs by their similarity in a given case. The existing approach does so by weighting perturbations by similarity to an actual outcome generated by a model, rather than using training data to ascertain a full range of values for a given variable. The perturbations are typically small and relate to the weighted similarities for an input. Although the existing approach provides insights as to what variables are important, the approach generally does not provide a measure of impact to a case. By contrast, embodiments disclosed herein evaluate training data provide a full range of values used to randomly sample an input variable, which allow a reasonably accurate measure of impact of a variable on a case.

Further, currently existing approaches generally do not provide ways to predefine groups of variables for analysis. A consequence of this is that although a model may derive numerous versions of a given variable, an end user reviewing the results may have difficulty interpreting what the results mean relative to a given variable. Advantageously, embodiments presented herein allow definitions of groups of variables into categories, which in turn allows further insights on impact to a model case on a group level, in addition to an individual variable level.

Note, the following uses predictive modeling for forecasting a likelihood that an individual will default on a loan as a reference example. The reference example is used to illustrate determining which model input variables significantly influence a model case. However, one of skill in the art will recognize that embodiments disclosed herein may be adapted to a variety of settings and to a variety of predictive modeling techniques.

For example, in healthcare, embodiments may be adapted to a regression model used to determine a likelihood that a patient is susceptible to a certain condition, given input variables of current medications, biometric information, age, gender, family history, and the like. Embodiments may determine which of those variables more significantly impacts the outcomes estimated by the model based on the shuffling of values for each variable individually allowing specific prescriptive outcomes.

FIG. 1 illustrates an example computing environment 100, according to one embodiment. As shown, the computing environment 100 includes a prediction server 105, an application server 110, and a database server 115, each interconnected via a network 120 (e.g., the Internet).

Each of the prediction server 105, application server 110, and database server 115 may correspond to a physical computing system (e.g., a desktop computer, workstation, laptop device, etc.) or a virtual computing instance executing on a cloud network. Further, although FIG. 1 depicts the configuration of software components as executing on separate servers, the components may all reside on one system (e.g., as a single application, as multiple applications, etc.).

In one embodiment, the prediction server 105 includes a predictive modeling application 107. The predictive modeling application 107 is configured to perform one or more predictive modeling techniques used to generate predictive models 109 that forecast outcomes from a set of input data. In one embodiment, the predictive modeling application 107 is implemented via a programming language generally used for statistical computing, such as R. Of course, the predictive modeling application 107 may be implemented using a variety of programming languages (e.g., C, Python, Java, etc.).

In an example, assume that the computing environment 100 corresponds to an enterprise that processes loan applications for individuals. The enterprise may want to determine a likelihood that a given individual may default on a loan. Relevant factors for determining such a likelihood may include credit history, age, occupation, salary, requested amount, number of people in the individual's household, and the like. In this example, the enterprise may obtain that information from the individual (e.g., provided through the loan application that the individual completes).

Further, a database service 117 (executing on the database server 115) may store this data as a record on a database, such as in a data warehouse 118. The data warehouse 118 may provide modeling data organized by variables used for input to a model function invoked by the predictive modeling application 107. Further, the modeling data also includes training data (i.e., data used to estimate model parameters and refine the accuracy of the model) and test data (i.e., data used to validate the accuracy of the model). In one embodiment, the database service 117 corresponds to a relational database application that manages access to the modeling data. For example, the prediction modeling application 107 may access modeling data corresponding to an individual using database queries from the data warehouse 118, and the database service 117 may return the corresponding data, e.g., as a markup language file (e.g., in XML format).

The prediction modeling application 107 obtains modeling data, which includes case data associated with an individual (e.g., presented as a record or a row of the modeling data). The prediction modeling application 107 uses the modeling data as input for a modeling function. In this example, when the function is invoked, the prediction modeling application 107 performs a decision tree modeling technique to determine a likelihood that the individual will default on a loan. The prediction modeling application 107 generates outcomes resulting from the technique. Further the prediction modeling application 107 may generate a visualization and/or summary of the resulting outcomes for presentation to a user, e.g., via an application 112 providing a management console. The summary allows a user to access the outcomes for, e.g., viewing, further analysis, recordkeeping, etc., on the management console.

In one embodiment, the predictive modeling application 107 provides a variable analysis tool 108 that supplements the resulting outcomes with information describing input variables affecting the outcomes. As further described below, the variable analysis tool 108 does so by iteratively performing the modeling technique, where at each iteration, values for a given input variable is randomly sampled while the other input variable values remain constant. Doing so can result in deviations to the resulting outcomes, where relatively large deviations in the outcomes in a given iteration can indicate that the underlying input variable influences the model for that case. In one embodiment, the variable analysis tool 108 is implemented as a wrapper function that is included in the source code of the predictive modeling application 107.

Figure 2:
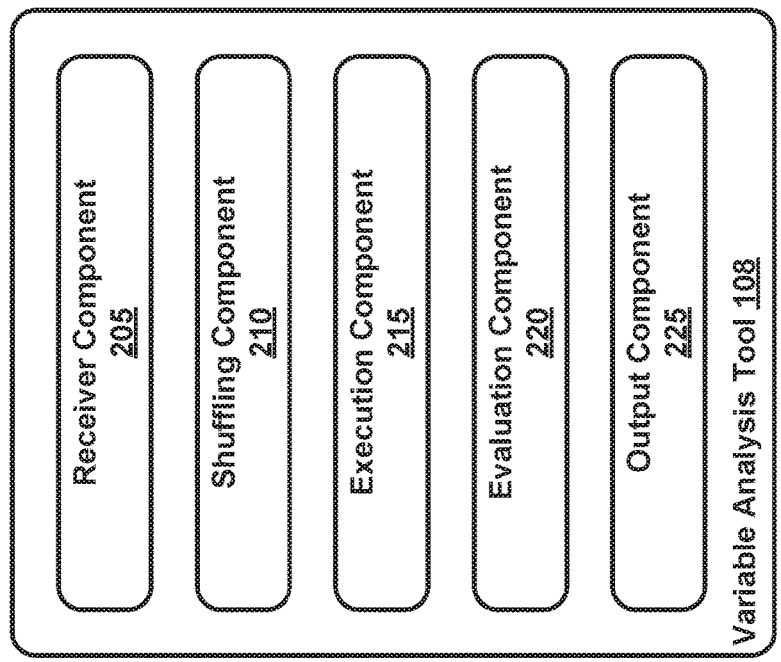
FIG. 2 further illustrates the variable analysis tool described relative to FIG. 1, according to one embodiment.

FIG. 2 further illustrates the variable analysis tool 108, according to one embodiment. In particular, FIG. 2 presents a conceptual diagram of the process steps performed by the variable analysis tool 108. One of skill in the art will recognize that the actual allocation of process steps in practice may vary substantially from this illustration. As shown, the variable analysis tool 108 includes a receiver component 205, a shuffling component 210, an execution component 215, an evaluation component 220, and an output component 225.

As mentioned, the prediction modeling application 107 may invoke the variable analysis tool 108 (e.g., using a wrapper function) when performing a prediction modeling technique on the modeling data. The receiving component 205 obtains information regarding the model, modeling data (e.g., the training and testing data associated with the model), and a specification of a case to evaluate (e.g., a selection of one or more of the rows of the modeling data). Further, the receiving component 205 may obtain a specification of an amount of values to sample for each input variable. Further still, the receiving component 205 may obtain a categorization of a group of two or more variables for evaluation (e.g., as opposed to or in addition to evaluating each variable separately). Grouping variables together as an individual category may allow the variable analysis tool 108 to account for instances where a correlation might exist for those variables, rather than on an individual variable.

The prediction modeling application 107 may provide the model, modeling data, specified case, sampling specification, and grouping specifications as parameters to the invoked function. This information may also be provided from a command line script executed via the management console.

The shuffling component 210 randomizes values or characteristics for an input variable in the modeling data. For example, the shuffling component 210 does so using bootstrap resampling over the values associated with the input variable. The execution component 215 performs the underlying modeling technique to the modeling data, as modified by the shuffling component 210. In particular, the execution component 215 may perform the modeling technique iteratively, where prior to the start of each iteration, the shuffling component 210 performs a bootstrap resampling of values for a given input variable (or specified group of variables), while holding all other input variables at the original value provided in the modeling data. At the next iteration, the previously sampled input variable is reverted to the original value, and the next input variable is then sampled. The execution component 215 continues iteratively until the input variables (and specified groups, if present) are exhausted.

Each iterative performance of the iterative technique yields resulting outcomes. In one embodiment, the outcomes are represented as numeric scores. For instance, the scores may indicate a likelihood of some event or characteristic being present. The evaluation component 220 determines a standard deviation measure between the resulting scores and a reference set of scores. The reference scores are a set of scores obtained when performing the modeling technique on the original set of modeling data (i.e., unmodified by the shuffling component 210). In one embodiment, the evaluation component 220 may compute a measure of impact from the standard deviation. This measure represents the likelihood that the input variable (or group of input variables) influences scores generated by the model for that case.

Further, the evaluation component 220 identifies input variables having a relatively significant impact on the model for the case. For example, the evaluation component 220 may determine, for a given input variable (or group of input variables), whether the impact measure exceeds a threshold. The threshold itself may be specified as part of a configuration of the variable analysis tool 108. Alternatively, the threshold may be a cut-off of input variables, e.g., the three variables having the highest impact measures.

Further still, the evaluation component 220 may also determine additional insights based on the results generated by the execution component 215. For example, if a sampled value is greater than the original value for an input value, the evaluation component 220 may identify the effect that the sampled value has on resulting scores, such as whether the result is greater or less than the reference scores.

The output component 225 may generate a summary based on the results produced by the evaluation component 220. The summary provides insights which include the model run on the data, sampled values for each variable and defined group of variables, reference scores for the original set of data, and scores resulting from the sampled values. The summary may also provide additional insights based on the shuffling, such as impact measure for each variable, a ranking of the variables based on the impact measure, an indication of how a variable affects the model (e.g., positively, negatively, minimally, etc.), and the like.

In one embodiment, the output component 225 generates the summary by obtaining the aforementioned insights, creating a markup language file (e.g., a JSON file, XML file, etc.), and populating the markup language file with the data. Another example of an output file is a spreadsheet document. Further, the output component 225 may generate a visualization of the summary data, such as through tables, plots, and graphs representing the aforementioned insights. The output component 225 may store the summary and visualizations in a data store, e.g., residing on the prediction server 105. In turn, the management console can obtain the summary from the data store and present the summary data via a graphical user interface.

Figure 3:
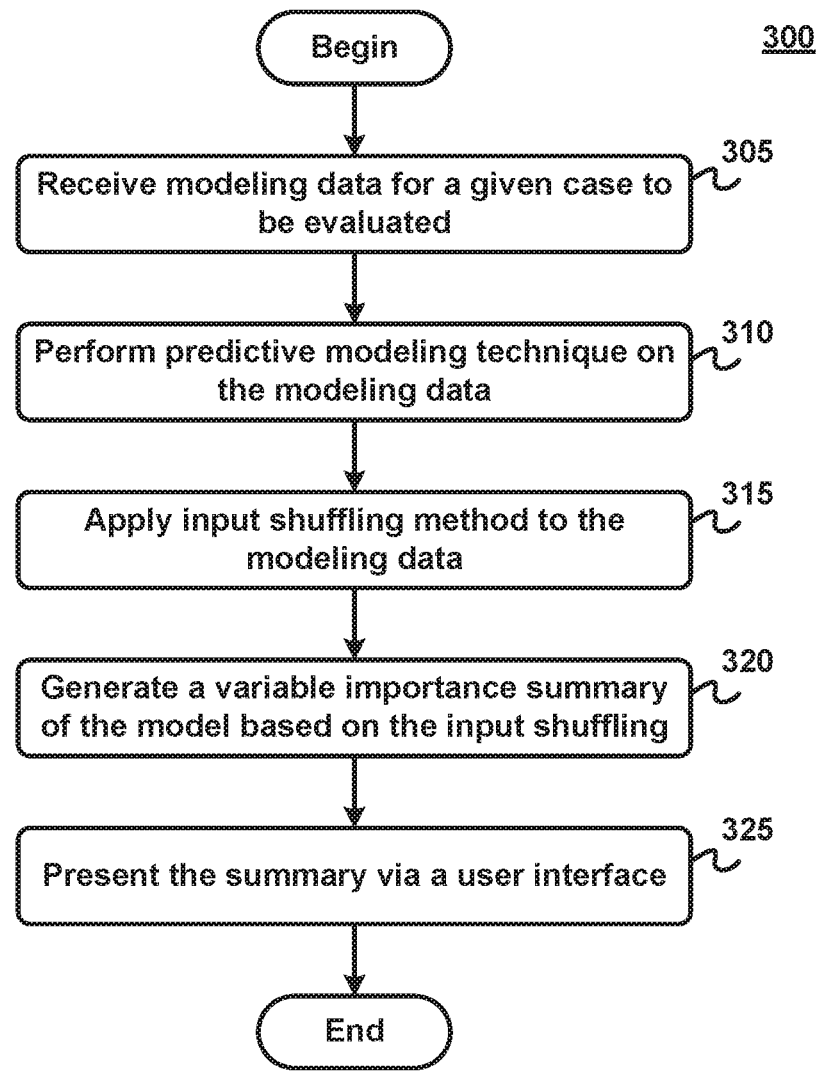
FIG. 3 illustrates a method for evaluating a predictive model for a given case, according to one embodiment.

FIG. 3 illustrates a method 300 for evaluating a model for a given case, according to one embodiment. As shown, the method 300 begins at step 305, where the predictive modeling application 107 receives model data, including data associated with a given case (e.g., as a record or a row) for evaluation. For example, the predictive modeling application 107 may retrieve the model data from the database service 117, e.g., by performing a query to the database service 117 requesting the data corresponding to the case. In turn, the database service 117 may transmit the modeling data to the predictive modeling application. The modeling data includes training data for the underlying modeling technique performed by the predictive modeling application 107 and data associated with the case.

For example, in this scenario, assume that the predictive modeling application 107 receives modeling data corresponding to a case where a user is investigating a likelihood that an individual will default on a loan. The modeling data may include values for variables taken as input by the model. The variables can be representative of categories such as gender, cohabitants, private loans owed by the individual, a requested loan amount, occupation, credit quality, duration of the requested loan, and the like.

At step 310, the predictive modeling application 107 performs the underlying modeling technique on the modeling data. Continuing the example, the underlying modeling technique can be a regression model used to predict the likelihood statistically, given the values of each of the input variables. Doing so results in scores that the variable analysis tool 108 uses as a reference set for comparison against models generated when shuffling values in input variables.

At step 315, the predictive modeling application 107 performs the input shuffling method techniques described herein. For example, the predictive modeling application 107 may invoke a wrapper function that accesses the components of the variable analysis tool 108. The predictive modeling application 107 may pass the model technique, model data, and case data as parameters to the function. In addition, the predictive modeling application 107 may also pass parameters such as an amount to sample in each model variable, variable groupings, and the like. The predictive modeling application 107 may also pass the reference set of scores generated on the original values for the input variables. The input shuffling method is described in further detail relative to FIG. 4.

In one embodiment, the variable analysis tool 108 returns the results of the input shuffling method to the predictive modeling application 107. The results include scores obtained from each execution of the modeling technique for each input shuffling iteration and variable importance insights generated by the variable analysis tool 108. At step 320, the predictive modeling application 107 generates a summary of the model including the variable importance insights. In one embodiment, the variable analysis tool 108 may generate the summary (e.g., via the output component 220) and send the summary to the prediction modeling application 107.

At step 325, the prediction modeling application 107 presents the summary to a user interface. For instance, the prediction modeling application 107 may store the summary in a data store for retrieval by the management console. The management console may then load the summary for viewing by graphically presenting the data generated by the variable analysis tool 108 on the user interface, e.g., through charts, tables, and graphs that include summary data. As another example, the prediction modeling application 107 may itself provide a user interface and console for graphically presenting the summary for viewing by a user.

Figure 4:
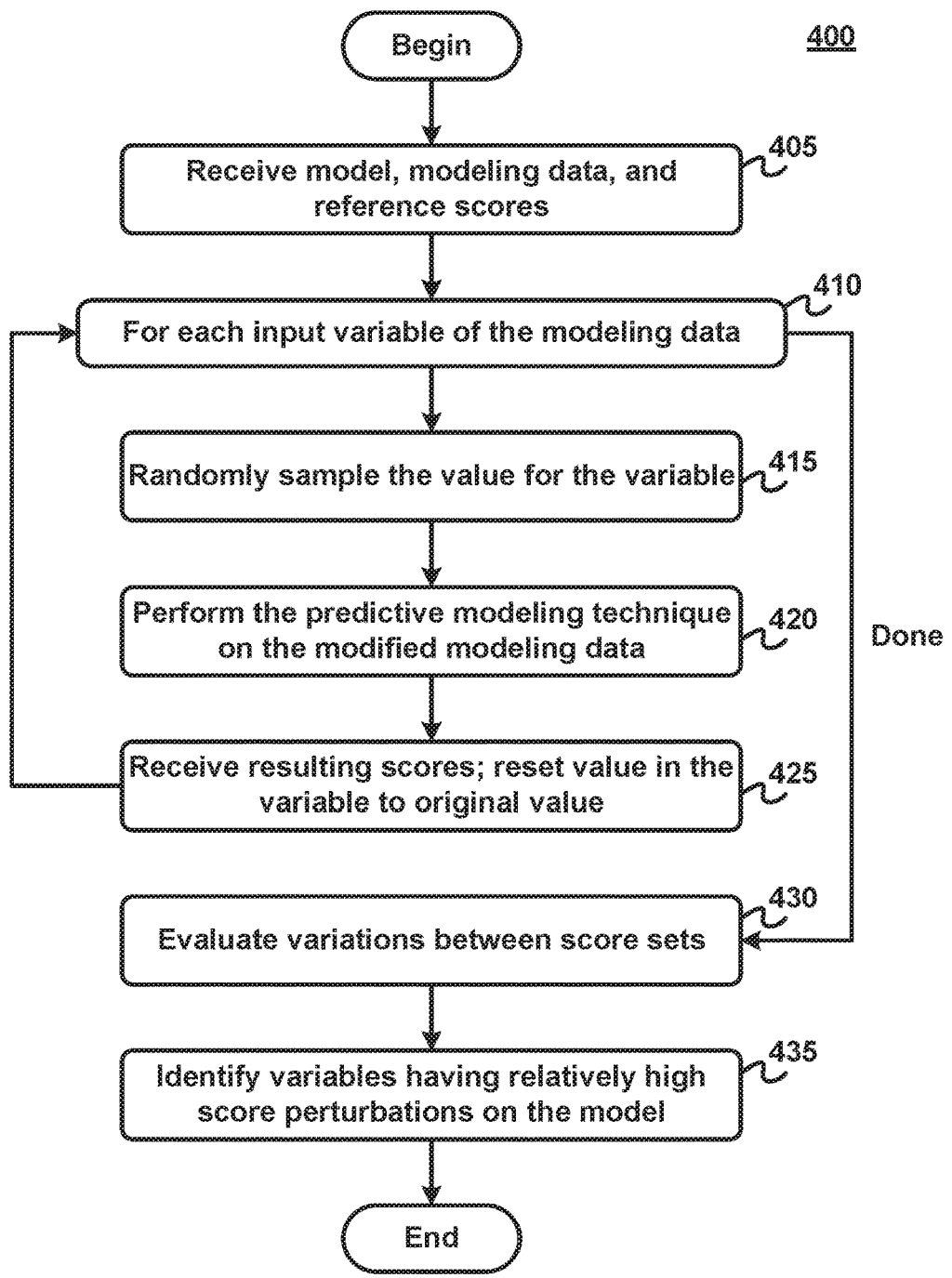
FIG. 4 illustrates a method for determining an importance of an input variable for a given predictive model, according to one embodiment.

FIG. 4 illustrates a method 400 for determining an importance of an input variable for a given predictive model, according to one embodiment. In particular, the method 400 provides steps for the input shuffling method by the variable analysis tool 108, briefly discussed relative to FIG. 3. As shown, the method 400 begins at step 405, where the receiver component 205 receives the model, training data, and reference scores from the predictive modeling application 108.

At step 410, the method 400 enters a loop for each variable that the model takes as input. At step 415, the shuffling component 210 randomly samples the value for the variable. In particular, the shuffling component 210 determines acceptable values for the input variable. For instance, to do so, the shuffling component 210 identifies the variable type. For example, if the variable corresponds to one that takes numeric values, the shuffling component 210 determines the range of acceptable numeric values. Such a range may be specified in the model. Once determined, the shuffling component 210 performs bootstrap resampling of values for the variable to use when performing the predictive modeling technique. Generally, bootstrapping relates to any test or metric that relies on random sampling with replacement. Various bootstrapping methods may be used within context of the present disclosure.

At step 420, the execution component 215 performs the underlying predictive modeling technique on the modeling data, where the modeling data includes the modifications to the values for the input variable. Doing so results in a generated statistical model that includes scores reflecting estimated outcomes. At step 425, the evaluation component 220 receives the resulting scores from the model. Further, the shuffling component 210 resets the input variable to the value originally provided in the modeling data. The method 400 then returns to step 415.

Once the loop completes, scores corresponding to each iteration are obtained as a result. At step 430, the evaluation component 220 determines variations between each set of scores with the reference set of scores generated from the original modeling data. For example, the evaluation component 220 may determine the variation by determining a standard deviation measure between the sets of scores. The evaluation component 220 may also correlate effects occurring to the model based on the variable values used to produce the resulting score, such as whether the score is higher as a result of a greater value for that variable, or if the score is lower as a result of the greater value.

In one embodiment, the evaluation component 220 may use the standard deviation to compute a measure of impact that the corresponding variable has on the model for the individual case. For example, the impact measure may be determined relative to the standard deviation measures obtained for other input variable runs. At step 435, the evaluation component 220 identifies the variables that have a relatively significant influence on the model based on the evaluation. For example, the evaluation component 220 may do so by evaluating the impact measure of a given input variable against a specified threshold. The evaluation component 220 determines that variables associated with scores exceeding the threshold have such influence on the model on a case level. The output component 220 may return the results including the variable importance determination and additional insights (e.g., the effects on the model based on changes in variable values) to the predictive modeling application 107 for presentation via a user interface.

FIG. 5 illustrates an example 500 of a case where shuffling a given variable (via the variable analysis tool 108) does not impact results generated from a predictive model due to lack of variance in the output, according to one embodiment. In particular, FIG. 5 depicts tables 501, 502, 503, and 504.

Table 501 represents a sample of original modeling data values for variables V1, V2, and V3, which belong to a set that includes additional variables (not depicted in the table 501). In this example 500, V1 represents a variable that takes Boolean "Yes" or "No" values as input. And V2 and V3 represent variables that take numeric values as input. Continuing the example of a model that determines a likelihood of default by an individual on a loan (here, a given individual is represented by row), the variables V1, V2, and V3 may represent characteristics such as whether an individual is male, a duration of the loan in years, and a credit quality metric, respectively.

Table 502 represents scores that result for each individual case where values in V1 are shuffled. Illustratively, the first column of table 502 shows the shuffled values. As shown, several of the values are shifted from "Yes" to "No," and vice versa. The second column of table 502 shows the scores resulting from performing the underlying predictive modeling technique. Table 503 represents a set of reference scores generated by performing the underlying predictive modeling technique on the original set of modeling data. Comparing the scores provided in table 502 and table 503, there is no change between the resulting scores, given the shuffling in V1.

Table 504 represents the difference between the scores provided in table 502 and the reference scores provided in table 503, followed by a mean standard deviation measure computed from the differences. Because there is no change between the resulting scores, the difference in each row of table 504 is 0. Consequently, the mean standard deviation measure is 0.

The zero value in the standard deviation measure may indicate that the value of V1 has little to no impact on the results produced by the model for the case. Therefore, it is likely that V1 does not significantly influence the outcome of model scores.

FIG. 6 illustrates an example of the case (originally described relative to FIG. 5) where shuffling a given variable (via the variable analysis tool 108) impacts results generated from a predictive model due to high variance in the output, according to one embodiment. FIG. 6 tables 601, 602, 603, and 604.

Like table 501, table 601 represents a sample of original modeling data values for variables V1, V2, and V3, which belong to a set that includes additional variables (not depicted in the table 601). Like in example 500, in example 600, V1 represents a variable that takes Boolean "Yes" or "No" values as input. And V2 and V3 represent variables that take numeric values as input. The variables V1, V2, and V3 represent characteristics such as whether an individual is male, a duration of the loan in years, and a credit quality metric, respectively.

In contrast to table 502, table 602 represents scores that result for each individual case where values in V2 are shuffled. Illustratively, the first column of table 602 shows the shuffled values. As shown, the values originally presented in the V2 column of table 601 are randomly shuffled. The second column of table 602 shows the scores resulting from performing the underlying predictive modeling technique. Similar to table 503, table 603 represents a set of reference scores generated by performing the underlying predictive modeling technique on the original set of modeling data. Comparing the scores provided in table 602 and table 603, there is considerable change between the resulting scores, given the shuffling of values in V2.

Table 604 represents the difference between the scores provided in table 602 and the reference scores provided in table 603, followed by a mean standard deviation measure computed from the differences. As shown, the change in the scores resulting from shuffling the values of V2 results in a mean standard deviation of 0.345.

The value in the standard deviation measure may indicate that the value of V2 has some impact on the results produced by the model for the case. As stated, the variable analysis tool 108 may derive a measure of impact from the standard deviation, e.g., by evaluating the standard deviation measure relative to standard deviations obtained when evaluating other input variables. The variable analysis tool 108 may determine, e.g., using thresholding of the impact measure, that variable V2 significantly impacts the model for the case.

Figure 7:
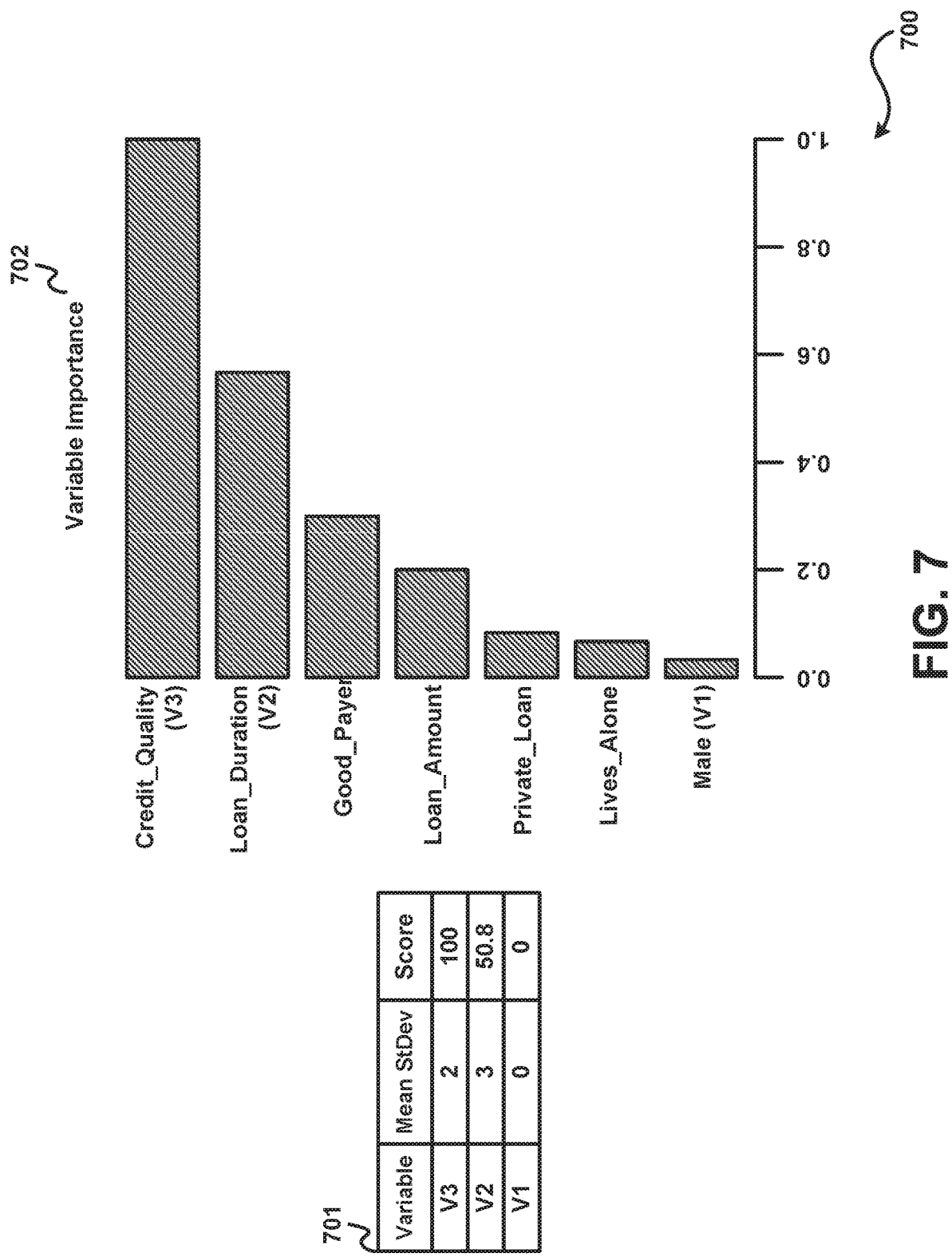
FIG. 7 illustrates an example summary depicting the impact that variables have on a given predictive model (described as shuffled variable output variance normalized to a 0-100 scale), according to one embodiment.

FIG. 7 illustrates an example summary 700 depicting the impact that variables have on a predictive model for an individual case. The summary 700 depicts a table 701 and a bar graph 702. Note, the summary 700 depicts merely a portion of a summary that can be generated by the variable analysis tool 108. In practice, the summary may include additional comprehensive insights, such as line graphs that plot values for a given variable to an outcome score, tables describing which variables increase the score the most, tables describing where in a value range that a sampled value was located, and so on.

Illustratively, the table 701 describes, for each variable V1, V2, and V3, what was the mean standard deviation computed from the input shuffling method, and the resulting impact measure score, each normalized to a 0-100 scale based on shuffled variable output. Further, the table 701 lists the variables in order of impact measure score. As shown, the variable V3 has the highest impact measure score of 100, V2 follows with an impact measure score of 50.8, and V1 has the lowest impact measure score of 0.

The bar graph 702 displays model variable importance of each of the variables (including V1, V2, and V3), listed by name. For example, variables include "Male" (V1), "Lives_Alone", "Private_Loan", "Loan_Amount", "Good_Payer", "Loan_Duration" (V2), and "Credit_Quality" (V3).

As illustrated in table 701 and bar graph 702, V1 has no influence on the resulting outcome of the predictive model for the case. That is, regardless of the value that V1 has when the predictive modeling technique is performed, the resulting outcomes will change little (or remain unchanged) from the original set of modeling data. By contrast, V3 likely has significant influence on the model, given the impact measure score. And while V2 has a higher mean standard of deviation measure, V2 appears to affect the model less than V3 does. The variable analysis tool 108 may provide additional insights that may indicate a reason that V2 affects the model less than V1. For example, other summary data may display how the variable input shuffling altered a score.

Figure 8:
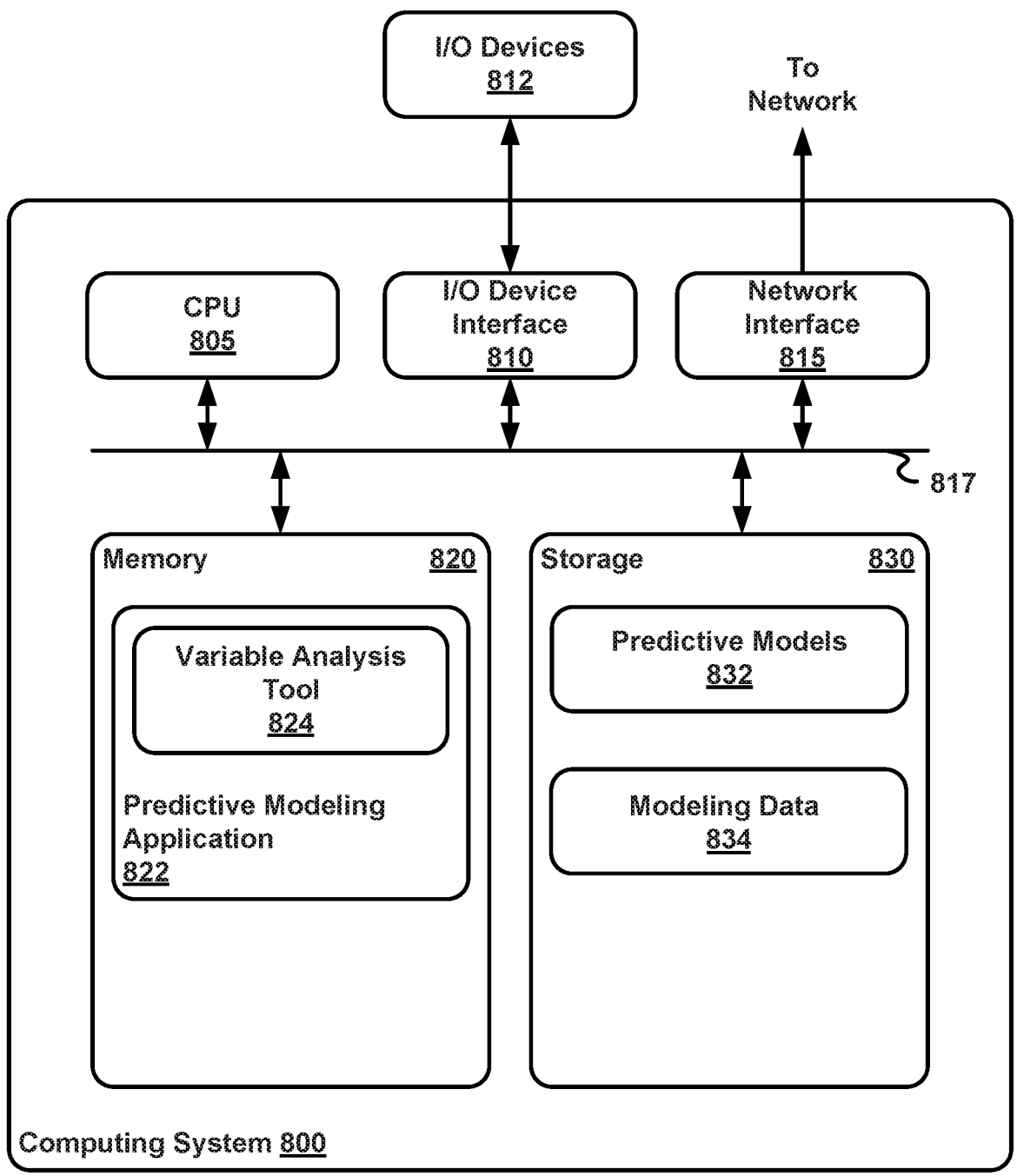
FIG. 8 illustrates an example computing system, according to one embodiment.

FIG. 8 illustrates an example computing system 800 configured to determine variable importance in a predictive model for a given case, according to one embodiment. As shown, the computing system 800 includes, without limitation, a central processing unit (CPU) 805, an I/O device interface 810, which may allow for the connection of various I/O devices 812 (e.g., keyboards, displays, mouse devices, pen input, etc.) to the system 800, network interface 815, a memory 820, storage 830, and an interconnect 817.

CPU 805 may retrieve and execute programming instructions stored in the memory 820. Similarly, the CPU 805 may retrieve and store application data residing in the memory 820. The interconnect 817 transmits programming instructions and application data, among the CPU 805, I/O device interface 810, network interface 815, memory 820, and storage 830. CPU 805 is included to be representative of a single CPU, multiple CPUs, a single CPU having multiple processing cores, and the like. Additionally, the memory 820 is included to be representative of a random access memory. Furthermore, the storage 830 may be a solid state or disk drive. Although shown as a single unit, the storage 830 may be a combination of fixed and/or removable storage devices, such as fixed disc drives, removable memory cards or optical storage, network attached storage (NAS), or a storage area-network (SAN). In some cases, system 800 may be a single physical system or a distributed system, such as in one or more computer systems or data centers, with processing capabilities, memory 820, and storage 830 distributed across multiple computer systems.

As shown, memory 820 includes a predictive modeling application 822. And the storage 830 includes predictive models 832 and modeling data 834. In one embodiment, the predictive modeling application 822 receives modeling data 834 as input to generate the predictive models 832 based on an underlying technique, such as a regression method, classification method, etc. The modeling data 834 includes training data used to train a given predictive model 832 and testing data used to validate the model 832. Further, the modeling data 834 may include case-level data used to determine predictive outcomes for a given case. Further still, the modeling data 834 is organized by variables that are received as input to the predictive model 832.

As shown, the predictive modeling application 822 includes a variable analysis tool 824. In one embodiment, the variable analysis tool 824 determines importance of each of the input variables to a given predictive model 832 for a case and outputs insights relating to the variable importance. To determine variable importance, the variable analysis tool 824 performs an input shuffling method that includes bootstrap resampling a given variable in the modeling data 834 while other variable values remain constant, and then performing the underlying prediction modeling technique on the modeling data. The variable analysis tool 824 continues to do so for each input variable of the model. The variable analysis tool 824 may then determine, based on score perturbations resulting from the input shuffling method, an impact that a variable has on the model for the case.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for determining variable importance on a predictive model on a case level, the method comprising:
    obtaining, at a predictive modeling application, modeling data that includes:
        a plurality of variables, wherein each variable of the plurality of variables has a corresponding value in each case for input to a predictive model;
        training data for training the predictive model; and
        validating data for validating the predictive model;
    generating via the predictive modeling application the predictive model based on the training data and the validating data;
    generating a first set of scores based on the modeling data and the predictive model;
    invoking a variable analysis tool of the predictive modeling application to generate a measure of impact for each variable of the modeling data, wherein for each of the plurality of variables:
        randomly resampling via bootstrap sampling the corresponding value of the variable in each case, wherein the random resampling includes identifying:
            a variable type, or
            a range of numeric values corresponding to the variable,
        generating a second set of scores based on implementing the predictive model on the modeling data having the resampled corresponding value of the variable, and
        determining the measure of impact based on a standard deviation between the first set of scores and the second set of scores, wherein the measure of impact indicates a likelihood that the variable affects scores generated by the predictive modeling technique;
    identifying one or more of the plurality of variables having a measure of impact that exceeds a specified threshold; and
    generating a summary including at least the identified one or more of the plurality of variables that exceed the specified threshold by:
        creating a markup language file, and
        populating the markup language file with the identified one or more of the plurality of variables.

2. The method of claim 1, further comprising:
    receiving a specification of at least a first and a second of the plurality of variables.

3. The method of claim 2, further comprising:
    randomly resampling the corresponding values of the at least the first and second variables;
    performing the predictive model on the modeling data having the resampled corresponding values to obtain a third set of scores; and
    determining a measure of impact based on a standard deviation between the first set of scores and the third set of scores, wherein the measure of impact indicates a likelihood that the at least the first and second variables affect scores generated by the predictive model.

4. The method of claim 3, wherein the resampling is performed using a bootstrap method using a range of values identified from training data included in the modeling data.

5. The method of claim 1, further comprising:
    outputting the summary to a user interface for user access.

6. The method of claim 1, wherein the summary includes at least a visualization of the identified one of more plurality of variables that exceed the specified threshold.

7. The method of claim 1, wherein the predictive model is one of at least a regression modeling technique or a classification modeling technique.

8. A non-transitory computer-readable storage medium storing instructions, which, when executed by a processor, performs an operation for determining variable importance on a predictive model on a case level, the operation comprising:
    obtaining, at a predictive modeling application, modeling data that includes:
        a plurality of variables, wherein each variable of the plurality of variables has a corresponding value in each case for input to a predictive model;
        training data for training the predictive model; and
        validating data for validating the predictive model;

generating via the predictive modeling application the predictive model based on the training data and the validating data;

generating a first set of scores based on the modeling data and the predictive model;

invoking a variable analysis tool of the predictive modeling application to generate a measure of impact for each variable of the modeling data, wherein for each of the plurality of variables:

randomly resampling via bootstrap sampling the corresponding value of the variable in each case, wherein the random resampling includes identifying:

a variable type, or a range of numeric values corresponding to the variable, generating a second set of scores based on implementing the predictive model on the modeling data having the resampled corresponding value of the variable, and determining the measure of impact based on a standard deviation between the first set of scores and the second set of scores, wherein the measure of impact indicates a likelihood that the variable affects scores generated by the predictive modeling technique;

identifying one or more of the plurality of variables having a measure of impact that exceeds a specified threshold; and generating a summary including at least the identified one or more of the plurality of variables that exceed the specified threshold by:

creating a markup language file, and populating the markup language file with the identified one or more of the plurality of variables.

9. The non-transitory computer-readable storage medium of claim 8, wherein the operation further comprises:

receiving a specification of at least a first and a second of the plurality of variables.

10. The non-transitory computer-readable storage medium of claim 9, wherein the operation further comprises:

randomly resampling the corresponding values of the at least the first and second variables;

performing the predictive model on the modeling data having the resampled corresponding values to obtain a third set of scores; and determining a measure of impact based on a standard deviation between the first set of scores and the third set of scores, wherein the measure of impact indicates a likelihood that the at least the first and second variables affect scores generated by the predictive model.

11. The non-transitory computer-readable storage medium of claim 10, wherein the resampling is performed using a bootstrap method using a range of values identified from training data included in the modeling data.

12. The non-transitory computer-readable storage medium of claim 8, wherein the operation further comprises:

outputting the summary to a user interface for user access.

13. The non-transitory computer-readable storage medium of claim 8, wherein the summary includes at least a visualization of the identified one of more plurality of variables that exceed the specified threshold.

14. The non-transitory computer-readable storage medium of claim 8, wherein the predictive model is one of at least a regression modeling technique or a classification modeling technique.

15. A system, comprising:

one or more processors; and a memory storing program code, which, when executed by the one or more processors, perform an operation for determining variable importance on a predictive model on a case level, the operation comprising:

obtaining, at a predictive modeling application, modeling data that includes:

a plurality of variables, wherein each variable of the plurality of variables has a corresponding value in each case for input to generate a predictive model;

training data for training the predictive model; and validating data for validating the predictive model;

generating via the predictive modeling application the predictive model based on the training data and the validating data;

generating a first set of scores based on the modeling data and the predictive model;

invoking a variable analysis tool of the prediction modeling application to generate a measure of impact for each variable of the modeling data, wherein for each of the plurality of variables:

randomly resampling via bootstrap sampling the corresponding value of the variable in each case, wherein the random resampling includes identifying:

a variable type, or a range of numeric values corresponding to the variable, generating a second set of scores based on implementing the predictive modeling technique on the modeling data having the resampled corresponding value of the variable, and determining the measure of impact based on a standard deviation between the first set of scores and the second set of scores, wherein the measure of impact indicates a likelihood that the variable affects scores generated by the predictive modeling technique;

identifying one or more of the plurality of variables having a measure of impact that exceeds a specified threshold, and generating a summary including at least the identified one or more of the plurality of variables that exceed the specified threshold.

16. The system of claim 15, wherein the operation further comprises:

receiving a specification of at least a first and a second of the plurality of variables.

17. The system of claim 16, wherein the operation further comprises:

randomly resampling the corresponding values of the at least the first and second variables;

performing the predictive model on the modeling data having the resampled corresponding values to obtain a third set of scores; and determining a measure of impact based on a standard deviation between the first set of scores and the third set of scores, wherein the measure of impact indicates a likelihood that the at least the first and second variables affect scores generated by the predictive model.

18. The system of claim 17, wherein the resampling is performed using a bootstrap method using a range of values identified from training data included in the modeling data.

19. The system of claim 15, wherein the operation further comprises:
   outputting the summary to a user interface for user access.

20. The system of claim 15, wherein the summary includes at least a visualization of the identified one of more plurality of variables that exceed the specified threshold.

* * * * *